(12) United States Patent
Schroeder et al.

(10) Patent No.: US 11,138,091 B2
(45) Date of Patent: Oct. 5, 2021

(54) REGRESSION ANALYSIS PLATFORM

(71) Applicant: SAP SE, Walldorf (DE)

(72) Inventors: Axel Schroeder, Dresden (DE); Martin Knechtel, Dresden (DE)

(73) Assignee: SAP SE, Walldorf (DE)

( * ) Notice: Subject to any disclaimer, the term of this patent is extended or adjusted under 35 U.S.C. 154(b) by 30 days.

(21) Appl. No.: 16/217,521

(22) Filed: Dec. 12, 2018

(65) Prior Publication Data

US 2020/0192780 A1    Jun. 18, 2020

(51) Int. Cl.
*G06F 11/36* (2006.01)
*G06F 8/41* (2018.01)

(52) U.S. Cl.
CPC ...... *G06F 11/3612* (2013.01); *G06F 11/3688* (2013.01); *G06F 8/41* (2013.01); *G06F 11/3664* (2013.01)

(58) Field of Classification Search
CPC .... G06F 11/3612; G06F 11/3688; G06F 8/41; G06F 11/3664; G06F 11/3636
See application file for complete search history.

(56) References Cited

U.S. PATENT DOCUMENTS

| | | | | |
|---|---|---|---|---|
| 5,815,720 A | * | 9/1998 | Buzbee | G06F 8/443 714/E11.209 |
| 7,730,470 B2 | * | 6/2010 | Sharapov | G06F 12/0862 717/151 |
| 7,890,941 B1 | * | 2/2011 | Garud | G06F 11/3612 717/158 |
| 8,381,285 B2 | | 2/2013 | Dau et al. | |
| 8,584,100 B2 | | 11/2013 | Xu et al. | |
| 8,615,631 B2 | | 12/2013 | Schroeder et al. | |
| 8,615,639 B2 | | 12/2013 | Schroeder et al. | |
| 8,990,166 B2 | | 3/2015 | Thomsen et al. | |
| 9,116,627 B2 | | 8/2015 | Thomsen et al. | |

(Continued)

OTHER PUBLICATIONS

Joseph Hummel et al. "Annotating the Java bytecodes in support of optimization", [Online], pp. 1003-1016, [Retrieved from Internet on Jun. 10, 2021], <https://onlinelibrary.wiley.com/doi/pdf/10.1002/%28SICI%291096-9128%28199711%299%3A11%3C1003%3A%3AAID-CPE346%3E3.0.CO%3B2-G> (Year: 1997).*

(Continued)

*Primary Examiner* — Ziaul A Chowdhury
(74) *Attorney, Agent, or Firm* — Fish & Richardson P.C.

(57) ABSTRACT

Techniques are described for detecting the presence of regressions in software, such as software that is being developed and tested in a development environment. Compiled code can be instrumented to introduce annotations to the compiled code. For example, the annotations can be added at the start and end of a code section, where a code section can be specified at any suitable degree of specificity (e.g., a line of code, a function, a component, multiple components, and so forth). When the instrumented code is executed, the annotations generate timing information that describes the execution times of the various annotated code sections. The timing information can be analyzed and compared to previously generated timing information for the code base, and detected differences may trigger actions such as reports, alerts, denied requests to pull code from the source repository, rejected code check-ins, bug reports, and so forth.

6 Claims, 5 Drawing Sheets

(56) References Cited

U.S. PATENT DOCUMENTS

| | | | |
|---|---|---|---|
| 9,354,988 B2 | 5/2016 | Schroeder et al. | |
| 10,649,873 B2* | 5/2020 | Cox | G06F 11/34 |
| 2002/0188831 A1* | 12/2002 | Jackson | G06F 11/3466 |
| | | | 712/227 |
| 2004/0148594 A1 | 7/2004 | Williams | |
| 2004/0210883 A1* | 10/2004 | Diedrich | G06F 8/54 |
| | | | 717/145 |
| 2004/0230763 A1 | 11/2004 | Cohen et al. | |
| 2008/0092121 A1 | 4/2008 | DeRose et al. | |
| 2008/0189086 A1* | 8/2008 | Ford | G06F 30/30 |
| | | | 703/2 |
| 2008/0196045 A1* | 8/2008 | Chang | G06F 9/45512 |
| | | | 719/320 |
| 2010/0138820 A1* | 6/2010 | Joshi | G06F 11/3612 |
| | | | 717/158 |
| 2010/0275185 A1 | 10/2010 | Burton et al. | |
| 2011/0047532 A1* | 2/2011 | Wang | G06F 11/3676 |
| | | | 717/130 |
| 2011/0145788 A1 | 6/2011 | Xu et al. | |
| 2012/0023482 A1* | 1/2012 | Welchman | G06F 11/3676 |
| | | | 717/125 |
| 2012/0084178 A1 | 4/2012 | Ehbauer et al. | |
| 2012/0324417 A1* | 12/2012 | Somani | G06F 9/44 |
| | | | 717/101 |
| 2013/0159339 A1 | 6/2013 | Thomsen et al. | |
| 2013/0194271 A1 | 8/2013 | Roesch et al. | |
| 2015/0026693 A1* | 1/2015 | Satoh | G06F 9/4881 |
| | | | 718/103 |
| 2015/0067700 A1* | 3/2015 | Kim | G06F 9/46 |
| | | | 718/107 |
| 2016/0188304 A1 | 6/2016 | Abadi et al. | |
| 2018/0024911 A1* | 1/2018 | Kruszewski | G06F 11/3664 |
| | | | 717/125 |
| 2018/0046562 A1 | 2/2018 | Yu et al. | |
| 2018/0300224 A1 | 10/2018 | Peng et al. | |
| 2018/0349119 A1* | 12/2018 | Zaidi | G06F 9/3855 |
| 2019/0065346 A1 | 2/2019 | Krauss | |
| 2020/0192789 A1 | 6/2020 | Peng et al. | |

OTHER PUBLICATIONS

Trevor Meyerowitz et al., "SourceLevel Timing Annotation and Simulation for a Heterogeneous Multiprocessor", [Online], pp. 276-279, [Retrieved from Internet on Jun. 10, 2021], <https://dl.acm.org/doi/pdf/10.1145/1403375.1403442> (Year: 2008).*

Renaud Pawlak, "Middleware Spoon: Compile-time Annotation Processing for Middleware", [Online], pp. 1-13, <https://ieeexplore.IEEE.org/stamp/stamp.jsp?arnumber=4039271 > (Year: 2006).*

U.S. Appl. No. 15/658,902, filed Jul. 25, 2017, Knechtel et al.

U.S. Appl. No. 15/861,857, filed Jan. 4, 2018, Jugel et al.

* cited by examiner

REGRESSION ANALYSIS PLATFORM

BACKGROUND

Software development organizations engage in various practices to ensure that the software produced is of sufficiently high quality, according to whatever standards or benchmarks are relevant in various scenarios. In many instances, an organization may test the generated software in various way to measure its quality. When attempting to develop or enhance software by making changes to its code, such as to fix bugs, add features, modify features, or for other purposes, developers may inadvertently introduce errors and/or inefficiencies into the code base, which may break the desired functionality, decrease performance, and/ or cause other types of problems. A software development organization may be interested in finding such regressions, preferably early in the development process, and identify the origin of the regressions. However, finding regressions and identifying their origin with sufficient precision can be a challenge.

SUMMARY

Implementations of the present disclosure are generally directed to software testing. More specifically, implementations are directed to techniques for identifying regressions in code by automatically instrumenting compiled code to include annotations, collecting timing information that is generated by the presence of the annotations when the compiled code is executed, comparing the timing information to previously generated timing information for the code base to identify possible regressions, and performing action(s) based on the comparison in some instances.

In general, innovative aspects of the subject matter described in this specification can be embodied in methods that include operations of: instrumenting compiled code to add annotations to the compiled code, the annotations added at a respective start and a respective finish of each of one or more sections of the compiled code; executing the compiled code, with the annotations, to generate timing information that indicates, for each of the one or more sections of the compiled code, a duration of execution of the respective section based on output from the annotations added at the respective start and the respective finish of the respective section; and determining a difference between the timing information and previously generated timing information and, in response, performing at least one action.

Implementations can optionally include one or more of the following features: the one or more sections includes one or more of a plurality of components of the compiled code, a single component of the compiled code, a single function of the compiled code, and a single line of the compiled code; the one or more sections of the compiled code correspond to a request for a change made to source code that is compiled to generate the compiled code; the at least one action includes rejecting the request for the change to the source code; rejecting the request includes denying a pull request from a source repository system; the at least one action includes generating and sending, to one or more users, a report that describes the difference between the timing information and the previously generated timing information; the at least one action includes creating, in a ticketing system, at least one ticket that describes the difference between the timing information and the previously generated timing information; and/or determining the difference between the timing information and the previously generated timing information includes determining that the timing information differs from the previously generated timing information by at least a threshold difference.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure can be apparent from the description and drawings, and from the claims.

DETAILED DESCRIPTION

Figure 1:
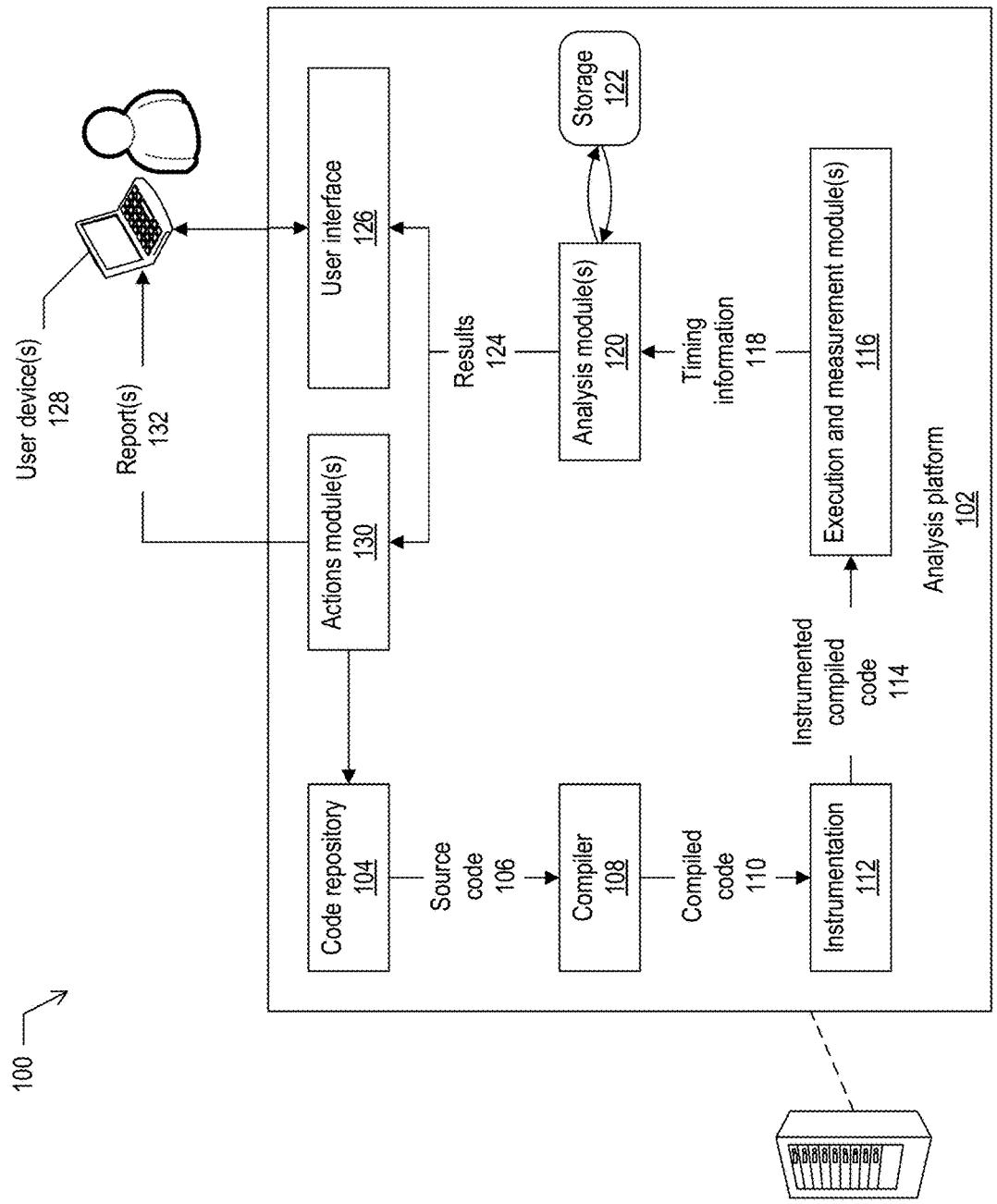
FIG. 1 depicts an example system for regression analysis, according to implementations of the present disclosure.

Implementations of the present disclosure are directed to systems, devices, methods, and computer-readable media for identifying the presence of regressions in software, such as software that is being developed and tested in a development environment. Implementations provide a technique (e.g., framework) for comparing a desired state with the as-is state for code changes introduced to software, such as during a software development process. For example, in response to a push of code changes to a source code repository, the code can be analyzed using the techniques described herein to identify regressions. Compiled code can be instrumented to introduce annotations to the compiled code. In some examples, the annotations are added at the start and end of a code section, where a code section can be specified at any suitable degree of specificity. For example, a code section can be a line of code, a function, a component, multiple components, and so forth. When the instrumented code is executed, the annotations generate timing information that describes the durations (e.g., execution times) of the various annotated code sections. The timing information can be analyzed and compared to previously generated timing information for the code base (e.g., as a baseline), and any detected differences in the timing may trigger actions such as reports, alerts, denied requests to pull code from the source repository, rejected code check-ins, bug reports, and so forth. Analysis results can be made available according to different levels of detail and/or specificity. Implementations can integrate feedback from the comparison into the development process during continuous integration processes.

Using the implementations described herein can lead to a significant reduction in development costs, by finding regressions earlier and clearly identifying the source of the regression (e.g., a particular code check-in or change). Implementations also help assure a focus on performance for the development team, leading to better performance of the code and a better user experience for end-users.

Code instrumentation annotations that generate the performance measurements can be added to the compiled code for the software to be tested, prior to execution of the compiled code. In some examples, execution of the compiled code within a suitable testing framework allows the measurement of execution times of code sections at various granularities, such as for packages, classes, functions (e.g., methods), lines of code, and so forth. From these measured performance times, performance reports can be generated with each test run. Multiple performance reports allow absolute or relative comparison among the reports, to automatically determine performance trends for the software under test. Such trends can be positive (faster) or negative (slower), and/or uncover different issues. Slower execution times can be caused by, for example, bad architecture decisions, integrated systems which become unreliable over time, bad coding, and so forth. Faster execution times can be caused by, for example, improved system architecture, coding optimization, and can also uncover problems such as that certain portions of the code are unintentionally being skipped and not executed.

FIG. 1 depicts an example system 100 for regression analysis, according to implementations of the present disclosure. As shown in this example, an analysis platform 102 is hosted on or otherwise provided by one or more computing devices of any suitable number and type. The analysis platform 102 (also described as the platform), can include a code repository 104 of any suitable type. Alternatively, the code repository 104 may be separate from the platform, and the platform may communicate with the code repository 104 over one or more networks. The code repository 104 can store any appropriate number and type of source code 106 modules. The source code 106 can be written in any suitable programming language(s). The code repository 104 can also operate as a version control system, tracking different versions of checked in code, enabling the specifying of different code trees or branches for different releases, and so forth.

The platform can include one or more compilers 108 that generate compiled code 110 (e.g., binary, executable code with machine-executable instructions) based on the source code 106. The compilers 108 can also include other tools that are used to generate executable code from source code modules and/or other information, such as linkers, build software, metadata interpreters, and so forth.

The platform can include instrumentation module(s) 112 that instrument the compiled code 110 by adding various annotations to the compiled code 110, as described herein, to generate instrumented compiled code 114. Instrumentation can include adding pairs of annotations (e.g., a start annotation and an end annotation) around one or more sections of the compiled code 110, at any suitable level of granularity.

For example, the annotated sections portions of the compiled code that correspond to individual lines of code, functions, classes, packages, individual components (e.g., function, class, package, etc.), sets of multiple components, and so forth.

The instrumented compiled code 114 can be received by execution and measurement module(s) 116 on the platform. The module(s) 116 execute the instrumented compiled code 114 (e.g., in a test environment) and capture the timing information 118 that is generated by the annotations during execution. The timing information 118 can indicate the start time (e.g., timestamp, indicating date and time) of an annotated section, the end time of the annotated section, and/or the duration (e.g., execution time) of the annotated section.

The timing information 118 can be provided to analysis module(s) 120 that execute on the platform to analyze the timing information 118. Such analysis can include comparing the timing information 118 to previously generated (e.g., baseline) timing information for the same annotated sections in the same code base, as measured in a previous test. The previous set(s) of timing information may be stored in and retrieved from storage 122. The storage 122 may include any suitable type of data storage and may be local to the platform and/or external storage. The analysis module(s) 120 can generate result(s) 124 that describe difference(s), if any, between the newly generated timing information 118 and the previously generated and stored timing information. For example, the result(s) 124 can indicate a percentage difference (e.g., faster or slower) between the two sets of timing information, and/or may indicate whether the difference, if any, exceeds a predetermined threshold amount with respect to absolute timing difference and/or relative (e.g., percentage) change in the timing information.

In some implementations, the platform provides a user interface (UI) 126 that publishes the result(s) 124. A user can employ a user device 128, of any suitable type of computing device, to access the UI 126 and view the result(s) 124. The result(s) 124 may be presented in any suitable format, include tabular results information, graphs showing trends or changes from version to version in the code base, and so forth.

The platform can also execute one or more actions modules 130 that automatically perform various actions based on the result(s) 124. For example, the action(s) can include generating report(s) 132 that describe timing differences, and communicating such report(s) 132 for viewing on user device(s) 128. Action(s) may also include interfacing with the code repository 104 to roll back a check in of code, label the checked-in code as exhibiting a regression, denying a request to pull the code from the code repository 104, identifying an individual who checked in the code that caused the regression, based on information stored in the code repository 104, sending notifications to such individual(s), and so forth. The action(s) can also include interfacing with an issue (e.g., bug) tracking system, creating a ticket in the system describing the regression, and so forth.

The platform can prepare for the timing measurement by instrumenting the code, and/or enabling time reports from unit tests. In the case of code instrumentation, the granularity can be determined, such as to measure timing of an end-to-end call, a single function (e.g., method), a single line of code, a block of code, a class, a package, and so forth. The instrumented code can be built and deployed to the target platform such that the particular instrumented code version checked in by the developer(s) is ready to be tested.

In some implementations, frameworks such as jUnit, cppUnit, Paxexam, Mockito, and so forth can be used to test the code, and the performance data may be collected in parallel as the testing is performed. Timing differences (e.g., deltas) can be computed against the stored timing information to look for trends and/or differences relative to prior executions. There may be several thresholds that are compared against for the last daily, weekly, and/or monthly performance. For example, threshold comparisons may be performed to accept at most a 1% daily increase in execution time, but reject a code change if such increases happen often enough to result in a monthly 10% increase. A determination can be made, e.g., by the analysis module(s) 120, whether the current performance is above or below the allowed threshold including an allowed tolerance factor. Such threshold and/or tolerance can be expressed in absolute timing (e.g., 20 ms), and/or as a percentage difference (e.g., 2%).

In the event of unexpected deviations outside of the allowed tolerance, the actions module(s) 130 can send a notification (e.g., email) that includes a report to, such as in response to a (e.g., Github) code pull request. A message can also be sent to a (e.g., Jira) ticketing system to track the issue in the ticketing system by generating a ticket and assigning it to the appropriate personnel (e.g., the developer who checked in the code that caused the regression). The responsible developer can read such notifications and determine whether this regression is expected, such as due to a new CPU-intensive feature. If it is unexpected, the code may be changed either by the developer themselves changing the code, or by filing a bug for another developer to work on.

In some implementations, the platform may automatically accept improvements in performance. This variant can replace developer approval in an instance where the code change improves performance (e.g., because the task was to increase performance). Implementations may also seek explicit developer approval even in instances where performance improves. For example, it may be suspicious if performance increases by 50% without the developer having an explanation for the reason, possibly indicating that some code is being skipped and/or executed incorrectly. In instances where the conventional, functional tests cover such functional regressions already, the explicit approval can still be performed to provide a second stop line for possible problems.

In some implementations, the framework and workflow described herein can be technically implemented and added to an existing build and test environment, such as with a performance testing trigger firing on a code push to the code repository (e.g., version control system) such as Gerrit, Github, Perforce, or other. As another example, the framework can integrate with an integration tool (e.g., Jenkins) as a performance reporting plugin running with vote jobs triggered on code push. In some implementations, an (e.g., email) report can be sent to ask for approval of the reported changes based on the identified regressions, if any. Implementations can also integrate and/or interface with task-tracking and/or issue-tracking systems such as Jira, Bugzilla, Team Foundation Server, and so forth.

During or after compile time, the code can be instrumented with measurement annotations (e.g., hooks) on an appropriate level, such as at the start/end of a process spanning multiple components, the start/end of a component, the start/end of a function (e.g., method), and/or the start/end of a code line. Once tests are being executed, timing measurement can be automatically triggered due to the presence of the instrumented code. After testing is completed, the timing information 118 can be created and collected by the module(s) 116 and/or 120, which can process the information and store it to the data storage 122. After successfully storing the information, a new set of timing information can be compared to previous timing information (e.g., daily, weekly, for each build, etc.) and determine whether configured thresholds are reached or not. The result(s) 124 of this analysis can be provided to the actions module(s) 130 which can trigger a report via e-mail, attach a report to the pull request, open a ticket in a ticketing system, or trigger any other suitable notification. In case of success, the code change(s) can be (e.g., silently) approved, for example by accepting a (e.g., Github) pull request. Additionally, a user with access to the platform UI 126 can view historical trends, such as in a dashboard that shows trends and deviations compared to the most recent code line, one week ago, and/or other comparison time points.

Figure 2A:
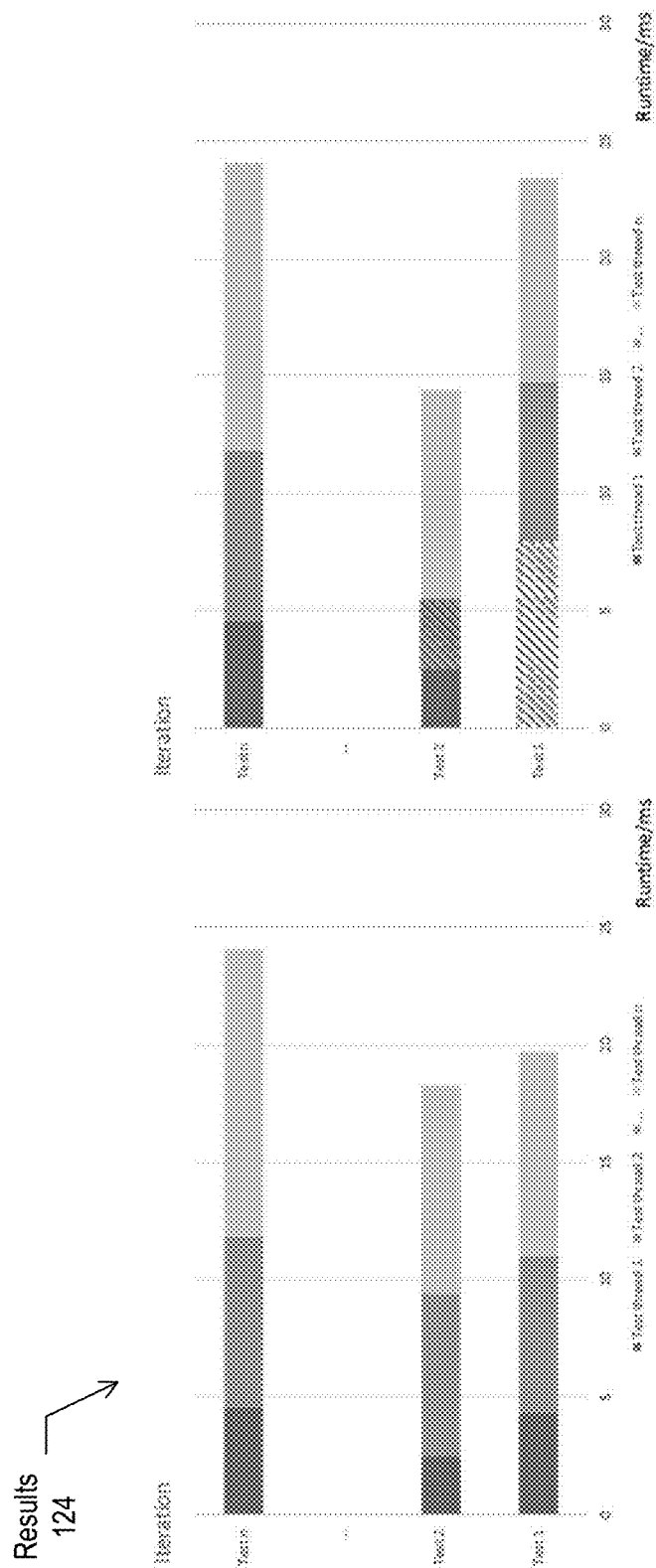
FIGS. 2A and 2B depict example analysis results, according to implementations of the present disclosure.
Figure 2B:
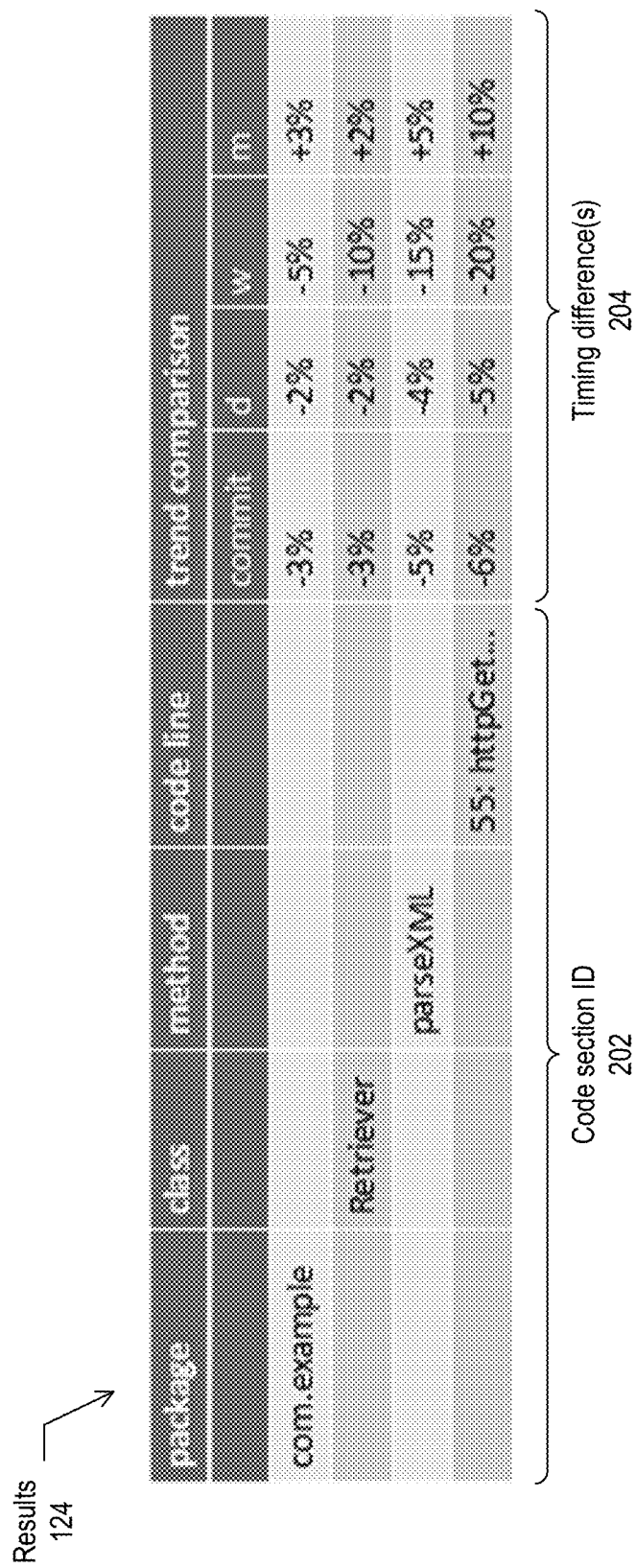

FIGS. 2A and 2B show example output result(s) that may be presented to users. FIG. 2A shows an example of results presented graphically. Tests such as integration tests, unit tests, systems tests, UI tests, and so forth may execute against instrumented code, such as performance information is collected in parallel with the results of these other tests. FIG. 2A shows the tests 1 through n running and reporting their performance. Internally, the tests might use parallelization and running with multiple threads 1 through n as depicted in this example. This may provide overall testing time reduction, test multitenancy isolation, stress testing, and so forth. In the example shown, the expected performance deviates from the current performance between the two iterations. For example, the code change pushed by the developer has made Test 2, Test thread 2 quicker and Test 1, Test thread 1 slower. These changes can be reported to the responsible developer and/or assigned reviewer.

FIG. 2B shows an example output in tabular form. Results can be shown at different levels of specificity, per package, class, method, code line, and so forth. A portion of the tabular output can specify the degree of specificity and a particular code section identifier (ID), e.g., specifying the name of a package (e.g., com.example), class (e.g., Retriever), method (e.g., parseXML), and/or code line (e.g., line 55). A second portion may list the timing comparison and/or trend across different time periods, such as daily (e.g., "d"), weekly (e.g., "w"), monthly (e.g., "m"), and so forth.

In the example trend comparison depicted, the recent performance deviates from previous measurements. Some code segments are slower than in the comparison time, e.g., for a previous commit, previous day, week, month, and so forth. These changes can be reported to the responsible developer and/or assigned reviewer.

The platform can instrument the code by adding references that indicate which sections of the code are associated with the timing measurements, enabling a determination of which sections of the code are responsible for a performance regression. Implementations can provide selectable granularity, e.g., as an end-to-end call, single method, single code line, as indicated by the annotations. The instrumented code can be built and deployed to the target platform so that the code version of the developer is ready to be tested.

Performance test results can be evaluated automatically. In some examples, this automatic evaluation can be performed using continuous integration tools (e.g. Jenkins). In some instances, testing the same or equivalent code twice can generate different performance values. Reasons for this could be different hardware, blocked threads, and so forth. Accordingly, implementations may use a tolerance factor, which may be configured within the continuous integration tool. This factor can describe the tolerance of how much performance results are allowed to deviate from the expected value (e.g., a standard or baseline). A tolerance factor can be defined absolutely (e.g., 20 ms) or as percentage (e.g. 2%).

For example, implementations may employ the follow parameters:

$T_{measured}$, a measured time (e.g., measured in ms);
$T_{standard}$, an expected (e.g., baseline, standard) time;
$tol_{absolute}$, an absolute tolerance (e.g., in ms);
$tol_{percentage}$, a relative tolerance (e.g., expressed as a percentage).

In examples where an absolute tolerance factor is employed, a code change can be accepted if $T_{measured} = T_{standard} \pm tol_{absolute}$. In examples where a relative tolerance factor is employed, a code change can be accepted if $T_{measured} = T_{standard} \pm (T_{standard} * tol_{percentage})$.

If a performance measurement lies within the expected tolerance range, the code change may be (e.g., automatically) approved. When approving a new change, the expected values can remain the same to assure that repeated tests over time do not slowly decrease in performance. In case of unexpected deviations outside of the tolerance factor, changes may be reported. Performance decrease can be reported to the responsible developer and/or reviewer, who can decide whether this is an expected outcome. When a change is accepted, its measured time can be set as the new standard (e.g., baseline). If the change is not accepted, the code may be changed to attempt and reduce or eliminate the measured regression. If the regression is unrelated to the tested code change and a side effect, a new bug can be filed in the task system of the development team, optionally including a copy of the measurement results and the diagram picture. In case of an error, the code can be revised and pushed to trigger the workflow to start anew.

Figure 3:
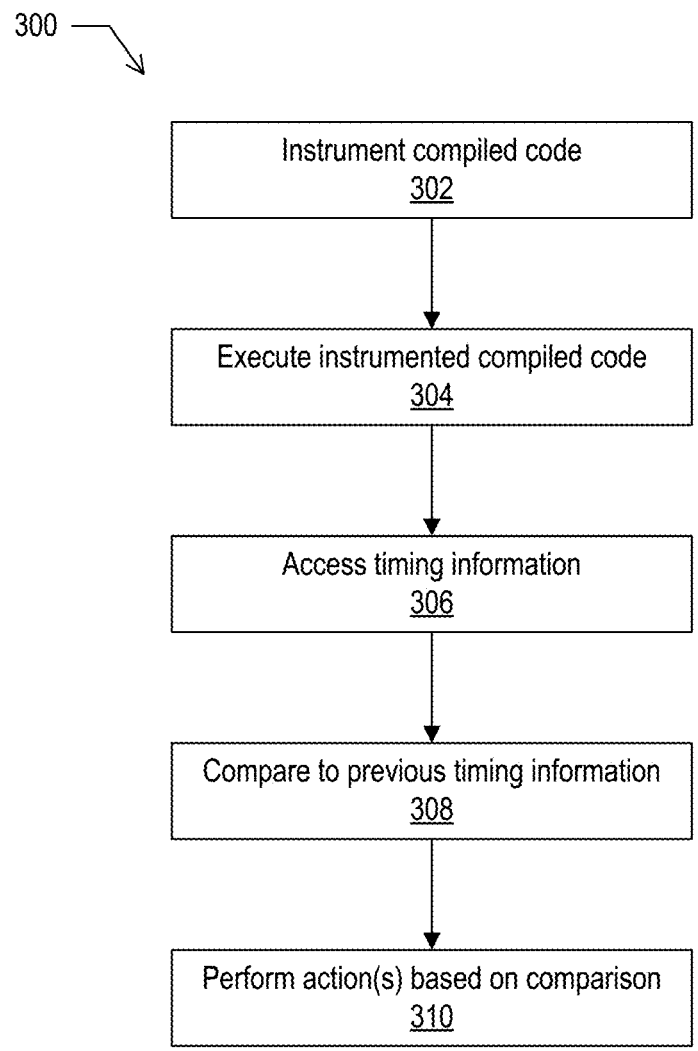
FIG. 3 depicts an example flow diagram of a process for regression analysis, according to implementations of the present disclosure.

FIG. 3 depicts an example flow diagram of a process for regression analysis, according to implementations of the present disclosure. Operations of the process can be performed by one or more of the execution and measurement module(s) 116, the analysis module(s) 120, the actions module(s) 130, the UI 126, and/or other software module(s) that are part of the analysis platform 102 and/or executing elsewhere.

A developer may pull code from the version control system, and make whatever changes are desired to the code to complete a task (e.g., add or modify a feature of the software, fix a previously identified bug, etc.). The changes made can then be pushed to the code repository/version control system. This may trigger the test system to verify the developer's changes. The code can be compiled and/or otherwise built, and the compiled code can be instrumented (302) as described above. The instrumented compiled code can be executed (304) and the generated timing information can be accessed (306). The timing information can be analyzed by comparison to the previous timing information (308). Action(s) can then be performed (310) based on the result(s) of the comparison, as described above.

Figure 4:
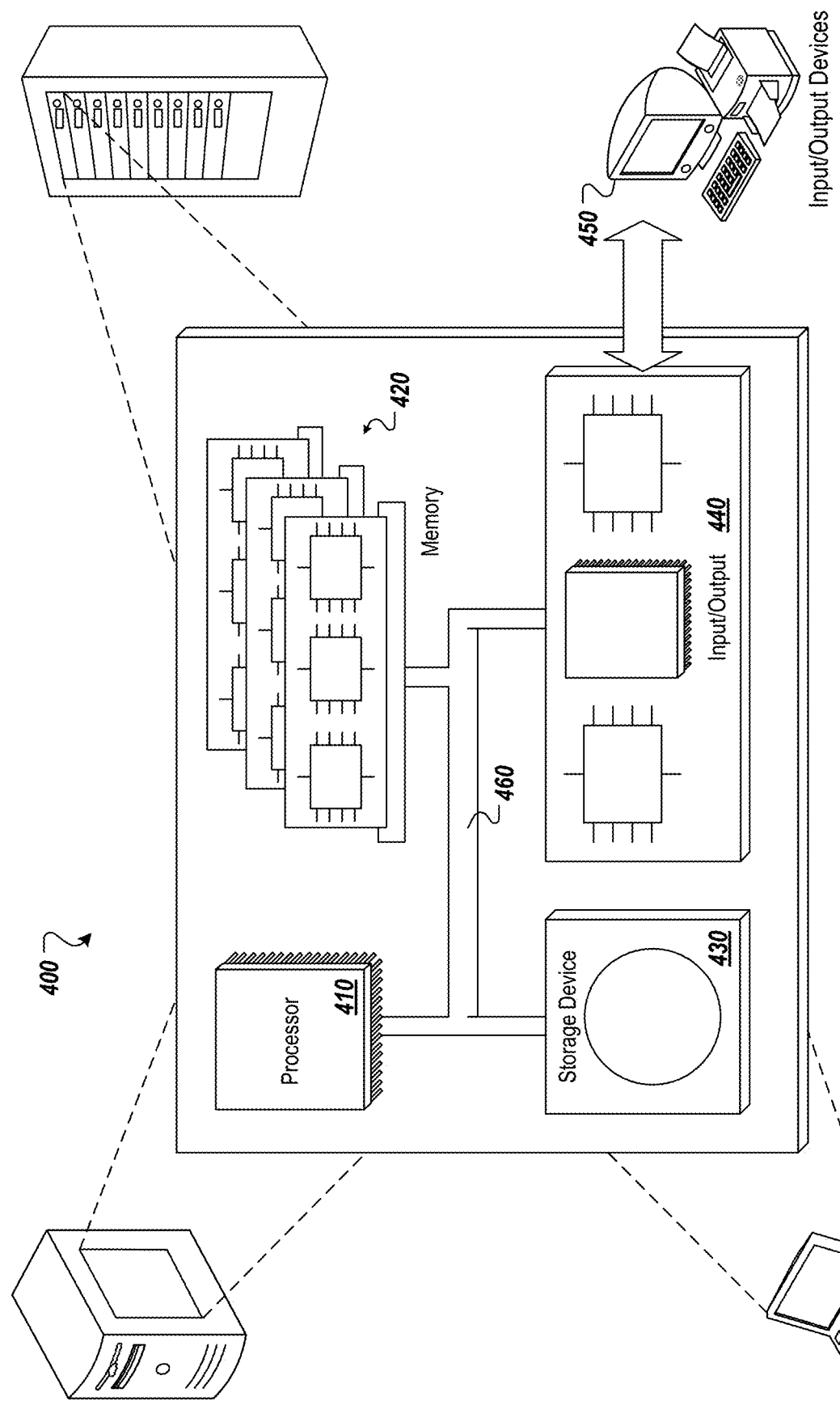
FIG. 4 depicts an example computing system, according to implementations of the present disclosure.

FIG. 4 depicts an example computing system, according to implementations of the present disclosure. The system 400 may be used for any of the operations described with respect to the various implementations discussed herein. For example, the system 400 may be included, at least in part, in computing device(s) that host or otherwise provide the analysis platform 102, the user device(s) 128, and/or other computing device(s) or system(s) described herein. The system 400 may include one or more processors 410, a memory 420, one or more storage devices 430, and one or more input/output (I/O) devices 450 controllable through one or more I/O interfaces 440. The various components 410, 420, 430, 440, or 450 may be interconnected through at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more networks using any network protocol.

Computing devices of the system 400 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it can be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
    instrumenting, by the at least one processor, compiled code to add annotations to the compiled code, the annotations added at a respective start and a respective finish of each of one or more sections of the compiled code, wherein the annotations are configured to output timing information upon execution that indicates, for each of the one or more sections of the compiled code, a duration of execution of the respective section, and wherein the one or more sections of the compiled code were compiled after a change was made to a source code corresponding to a request for the change made to the source code, where the source code was compiled to generate the compiled code;
    executing, by the at least one processor, the compiled code comprising the annotations to generate the timing information based on the output from the annotations added at the respective start and the respective finish of the respective section;
    identifying previously generated timing information, wherein the previously generated timing information was output by the annotations during execution of a previous version of the compiled code; and
        determining, by the at least one processor, a difference between the timing information and the previously generated timing information and, in response to the determining that the timing information differs from the previously generated timing information by at least a threshold difference, performing at least one action, wherein the at least one action comprises:
    rejecting the request for the change to the source code including denying a pull request from a source repository system and at least one of:
    generating and sending, to one or more users, a report that describes the difference between the timing information and the previously generated timing information; and
    creating, in a ticketing system, at least one ticket that describes the difference between the timing information and the previously generated timing information.

2. The method of claim 1, wherein the one or more sections includes one or more of:
    a plurality of components of the compiled code;
    a single component of the compiled code;
    a single function of the compiled code; and
    a single line of the compiled code.

3. A system, comprising:

at least one processor; and a memory communicatively coupled to the at least one processor, the memory storing instructions which, when executed by the at least one processor, cause the at least one processor to perform operations comprising:

instrumenting compiled code to add annotations to the compiled code, the annotations added at a respective start and a respective finish of each of one or more sections of the compiled code, wherein the annotations are configured to output timing information upon execution that indicates, for each of the one or more sections of the compiled code, a duration of execution of the respective section, and wherein the one or more sections of the compiled code were compiled after a change was made to a source code corresponding to a request for the change made to the source code, where the source code was compiled to generate the compiled code;

executing the compiled code comprising the annotations to generate the timing information based on the output from the annotations added at the respective start and the respective finish of the respective section;

identifying previously generated timing information, wherein the previously generated timing information was output by the annotations during execution of a previous version of the compiled code; and determining a difference between the timing information and the previously generated timing information and, in response to the determining that the timing information differs from the previously generated timing information by at least a threshold difference, performing at least one action, wherein the at least one action comprises:

rejecting the request for the change to the source code including denying a pull request from a source repository system and at least one of:

generating and sending, to one or more users, a report that describes the difference between the timing information and the previously generated timing information; and creating, in a ticketing system, at least one ticket that describes the difference between the timing information and the previously generated timing information.

4. The system of claim 3, wherein the one or more sections includes one or more of:

a plurality of components of the compiled code;

a single component of the compiled code;

a single function of the compiled code; and a single line of the compiled code.

5. One or more non-transitory computer-readable media storing instructions which, when executed by at least one processor, cause the at least one processor to perform operations comprising:

instrumenting compiled code to add annotations to the compiled code, the annotations added at a respective start and a respective finish of each of one or more sections of the compiled code, wherein the annotations are configured to output timing information upon execution that indicates, for each of the one or more sections of the compiled code, a duration of execution of the respective section, and wherein the one or more sections of the compiled code were compiled after a change was made to a source code corresponding to a request for the change made to the source code, where the source code was compiled to generate the compiled code;

executing the compiled code comprising the annotations to generate the timing information based on the output from the annotations added at the respective start and the respective finish of the respective section;

identifying previously generated timing information, wherein the previously generated timing information was output by the annotations during execution of a previous version of the compiled code; and determining a difference between the timing information and the previously generated timing information and, in response to the determining that the timing information differs from the previously generated timing information by at least a threshold difference, performing at least one action, wherein the at least one action comprises:

rejecting the request for the change to the source code including denying a pull request from a source repository system and at least one of:

generating and sending, to one or more users, a report that describes the difference between the timing information and the previously generated timing information; and creating, in a ticketing system, at least one ticket that describes the difference between the timing information and the previously generated timing information.

6. The one or more non-transitory computer-readable media of claim 5, wherein the one or more sections includes one or more of:

a plurality of components of the compiled code;

a single component of the compiled code;

a single function of the compiled code; and a single line of the compiled code.

\* \* \* \* \*